(12) United States Patent
Miyazawa et al.

(10) Patent No.: US 7,049,773 B2
(45) Date of Patent: May 23, 2006

(54) ELECTRIC POWER STEERING APPARATUS

(75) Inventors: Yasushi Miyazawa, Gunma (JP); Toru Sakaguchi, Gunma (JP); Kazuhiro Kumaido, Gunma (JP); Masayuki Aoki, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 11/192,077

(22) Filed: Jul. 29, 2005

(65) Prior Publication Data

US 2006/0022627 A1   Feb. 2, 2006

(30) Foreign Application Priority Data

Jul. 30, 2004   (JP) ............................. 2004-223808

(51) Int. Cl.
    *H02P 7/00* (2006.01)
(52) U.S. Cl. ..................... 318/432; 318/434; 323/284
(58) Field of Classification Search ............... 318/432, 318/434; 323/284
    See application file for complete search history.

(56) References Cited

U.S. PATENT DOCUMENTS

| | | | | |
|---|---|---|---|---|
| 4,611,682 A | * | 9/1986 | Yasuda et al. | 180/446 |
| 4,736,810 A | * | 4/1988 | Morishita et al. | 180/404 |
| 4,984,647 A | * | 1/1991 | Morishita et al. | 180/446 |
| 5,563,790 A | * | 10/1996 | Wada et al. | 701/41 |
| 5,912,539 A | * | 6/1999 | Sugitani et al. | 318/434 |
| 5,927,430 A | * | 7/1999 | Mukai et al. | 180/446 |
| 6,026,926 A | * | 2/2000 | Noro et al. | 180/446 |
| 6,070,692 A | * | 6/2000 | Nishino et al. | 180/443 |
| 6,808,043 B1 | * | 10/2004 | Kawada et al. | 180/446 |
| 6,837,331 B1 | * | 1/2005 | Kawada et al. | 180/446 |
| 6,913,109 B1 | * | 7/2005 | Kodama et al. | 180/446 |

FOREIGN PATENT DOCUMENTS

| | | |
|---|---|---|
| EP | 1 336 547 A1 | 8/2003 |
| JP | 07-329803 A | 12/1995 |
| JP | 8-91239 A | 4/1996 |
| JP | 8-91240 A | 4/1996 |
| JP | 10-29555 A | 2/1998 |
| JP | 10-194137 A | 7/1998 |
| JP | 11-150976 A | 6/1999 |
| JP | 11-217080 A | 8/1999 |
| JP | 2002-347635 A | 12/2002 |
| JP | 2002-359919 A | 12/2002 |
| JP | 2003-237609 A | 8/2003 |
| JP | 2003-237609 A | 8/2003 |
| JP | 2003-333889 A | 11/2003 |
| JP | 2004-104876 A | 4/2004 |
| JP | 2005-75309 A | 3/2005 |

\* cited by examiner

*Primary Examiner*—Rita Leykin
(74) *Attorney, Agent, or Firm*—Sughrue Mion, PLLC (57) ABSTRACT

An object of the present invention is to provide an electric power steering apparatus that can detect failure of a current detector quickly and with less misdetection using torque oscillation from a torque sensor. When the number of times N an absolute value of a differential value of a torque command value Tref exceeds a predetermined threshold value dTq in a predetermined time Tmr has reached a predetermined number Nref it is judged that the current detector has failed.

8 Claims, 9 Drawing Sheets

— 1 —
ELECTRIC POWER STEERING APPARATUS

BACKGROUND OF THE INVENTION

1. Field of the Invention

The present invention relates to an electric power steering apparatus, and in particular to an electric power steering apparatus that detects a failure of a motor current detector.

2. Prior Art

An electric power steering apparatus, which energizes a steering apparatus of an automobile or a vehicle with torque of a motor, energizes a steering shaft or a track shaft with an assist force by transmitting a driving force of the motor using a transmission mechanism such as gears or a belt via reduction gears. Such a conventional electric power steering apparatus performs a feedback control of a motor current in order to generate assist torque (steering assist torque) accurately. The feedback control is a control for adjusting a motor application voltage such that a difference between a current control value and a motor current detection value is reduced. The motor application voltage is adjusted, in general, according to adjustment of a duty ratio Du of PWM (pulse width modulation) control.

Figure 1:
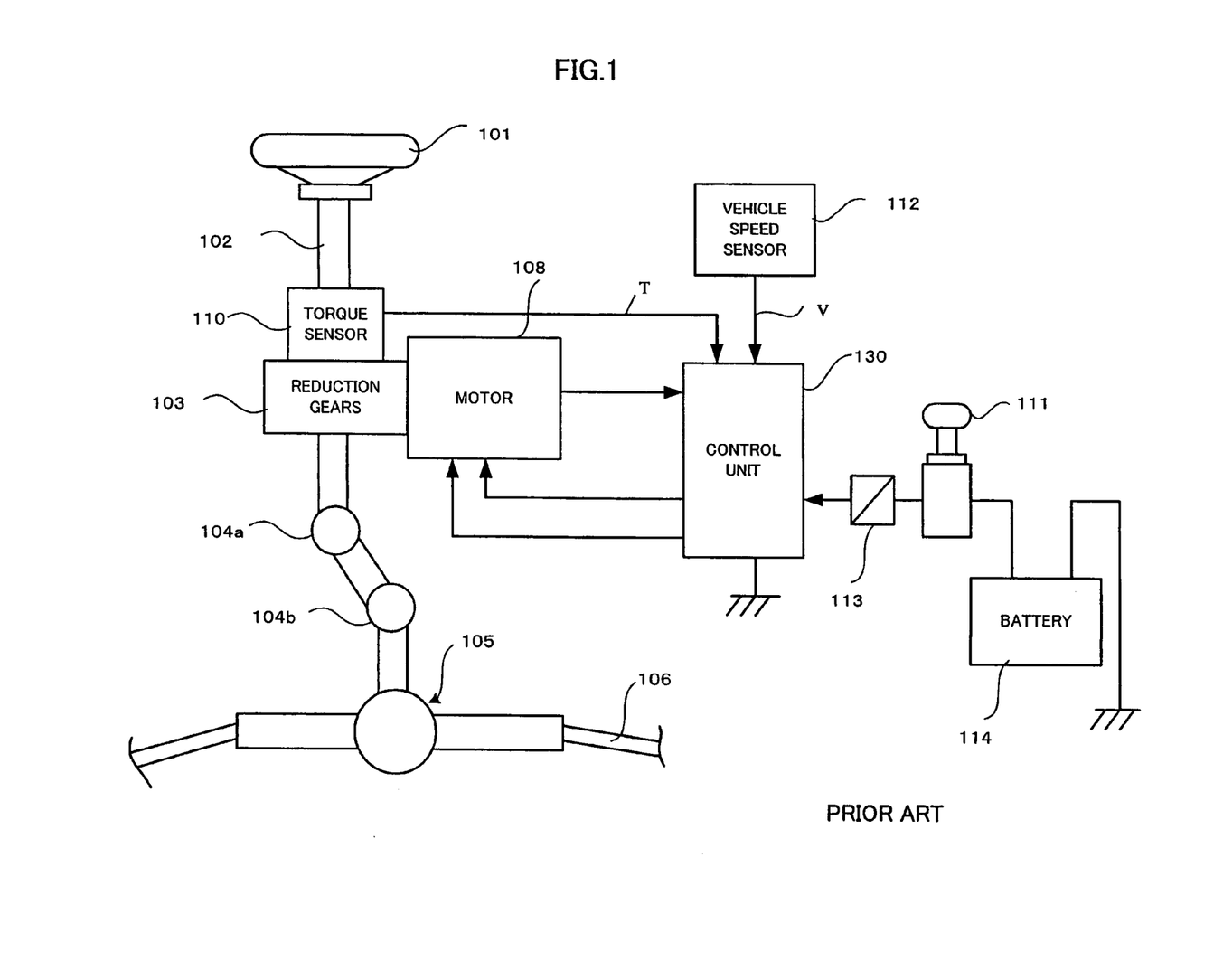
FIG. 1 is a block diagram showing a constitution of an electric power steering apparatus.

Here, a general structure of an electric power steering apparatus will be explained with reference to FIG. 1. A shaft 102 of a steering wheel 101 is connected to a tie rod 106 of a steered wheel through reduction gears 103, universal joints 104a and 104b and a pinion rack mechanism 105. A torque sensor 110, which detects steering torque of the steering wheel 101, is provided on the shaft 102. A motor 108, which assists a steering force of the steering wheel 101, is connected to the shaft 102 via the reduction gears 103. Electric power is supplied to a control unit 130, which controls the power steering apparatus, from a battery 114 through an ignition key 111 and a power supply relay 113. The control unit 130 computes a current command value Iref of an assist command on the basis of a steering torque T detected by the torque sensor 110 and a vehicle speed V detected by a vehicle speed sensor 112. The control unit 130 controls an electric current supplied to the motor 108 on the basis of the computed current command value Iref.

Figure 2:
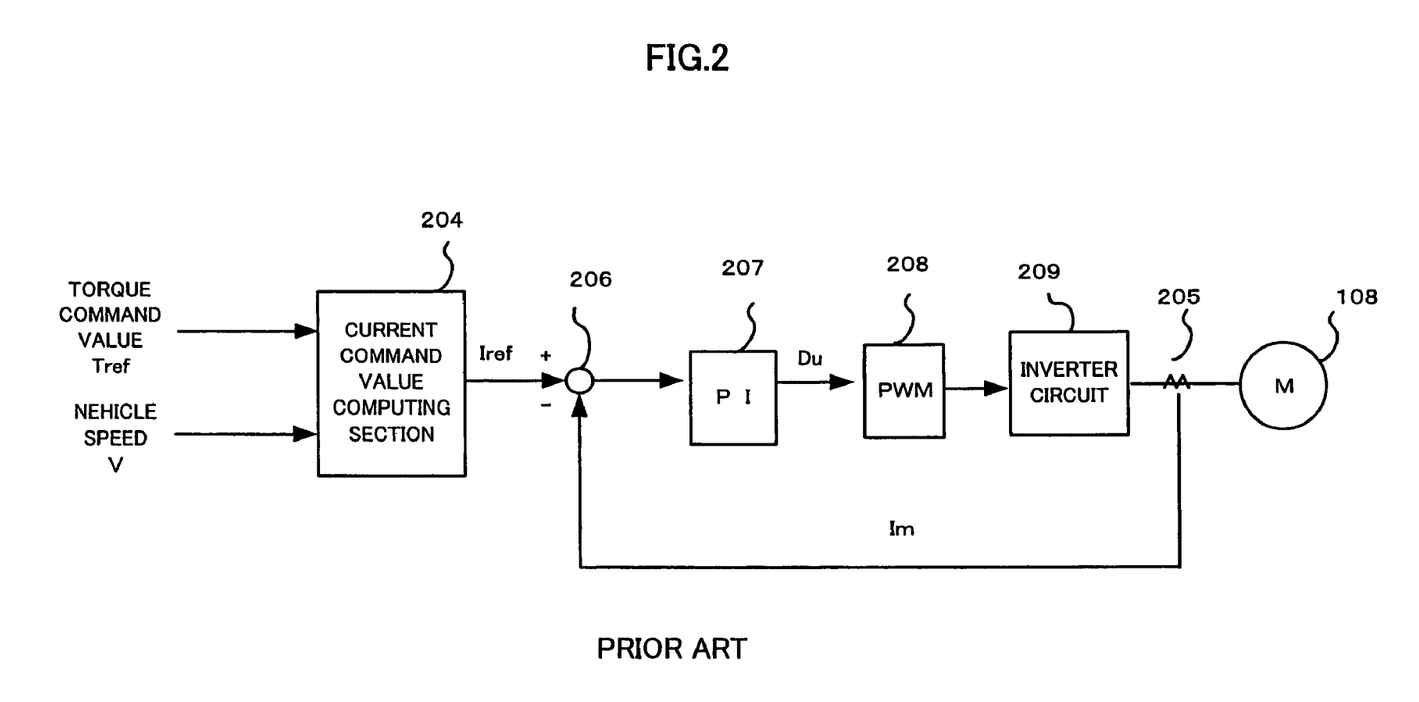
FIG. 2 is a block diagram showing an example of a conventional control unit.

The control unit 130 mainly includes a CPU (including a micro processor unit or a micro controller unit). A general function, which is executed according to a program in the CPU, is as shown in FIG. 2. For example, a current command value computing section 204 does not indicate a current command value computing section as independent hardware but indicates a current command value computing function that is executed in the CPU.

Functions and operations of the control unit 130 will be hereinafter explained. A torque command value Tref based on the torque detected by the torque sensor 110 and the vehicle speed V detected by the vehicle speed sensor 112 are inputted to the current command value computing section 204. The current command value Iref is outputted from the current command value computing section 204 and inputted to a subtracting section 206. On the other hand, a motor current Im detected by a current detector 205 is also feedbacked to the subtracting section 206. The subtracting section 206 calculates a deviation (Iref−Im). The deviation (Iref−Im) is inputted to a proportional-integral control section (a PI control section) 207. A duty ratio Du is outputted from the PI control section 207. The PWM control section 208 outputs a PWM signal to an inverter circuit 209 on the basis of the duty ratio Du. The inverter circuit 209 is subjected to PWM control on the basis of the PWM signal and supplies the motor current Im to the motor 108.

The above is an explanation of motor control for the electric power steering apparatus that is executed by the control unit 130. As described above, control for the electric power steering apparatus is performed on the basis of the detected motor current Im. Therefore, it is a necessary condition for the control of the electric power steering apparatus that a motor current can be detected correctly. Thus, when a current detector fails, it is necessary to detect the failure. When there is a separate current detector that should be compared with the current detector, it is possible to judge the failure by comparing an output of the current detector and an output of the separate current detector. However, when there is no current detector that should be compared with the current detector, the failure may be judged from outputs of sensors of other types.

For example, a Japanese Patent Application Laid-open No.2003-237609 A discloses a technique concerning mis-wiring abnormality detection in the case in which wiring to an assist motor is laid by mistake in a direction opposite to a normal direction. A detection principle for the miswiring abnormality detection is as described below. When wiring to the assist motor is laid by mistake, since a motor output becomes abnormal and a torque value to be detected oscillates. Thus, when a rate of change of the torque value increases to a predetermined value or more, it is judged that wiring of a current detector is laid by mistake.

The detection method in the document described above is a method for detecting miswiring. Permanent abnormality such as miswiring can be detected without a problem. However, in a case like failure of a current detector, an output of the current detector may show temporary abnormality rather than permanent abnormality. In such a case, there is a problem in that the abnormality cannot be detected with the detection method described above. In addition, failure is judged on condition that a rate of change of torque reaches a predetermined value or more. Thus, there is a problem in that it is extremely difficult to set a predetermined value for distinguishing oscillation in a torque value, which usually occurs, from oscillation due to abnormality of the current detector such that the predetermined value is not detected by mistake. In other words, misdetection is apt to occur.

SUMMARY OF THE INVENTION

The present invention has been devised in view of the circumstances described above and it is an object of the invention to provide an electric power steering apparatus that can detect not only permanent failure such as miswiring to an assist motor but also failure of a current detector, in which an output of the current detector becomes abnormal temporarily, and can detect failure of the current detector more surely.

The present invention relates to an electric power steering apparatus including: a motor that applies a steering assist force to a steering system of a vehicle; a torque sensor that detects a torque command value Tref generated in a steering shaft; and a current detector that detects a motor current Im of the motor, the electric power steering apparatus being controlled on the basis of at least a current command value Iref, which is calculated on the basis of the torque command value Tref, and the motor current Im. It is judged that the current detector has failed when the number of times N (N is an integer) an absolute value of a differential value of the torque command value Tref exceeds a predetermined threshold value dTq in a predetermined time Tmr has reached a predetermined number of times Nref, whereby the object of the present invention is attained.

The number of times N is the number of times $(N_m+N_{m-1})$ obtained by equally dividing the predetermined time Tmr into M pieces and adding the number of times Nm the absolute value exceeds the threshold value dTq in an Mth time frame to the total number of times $N_{m-1}$ the absolute value exceeds the threshold value dTq in first to (M−1)th time frames, whereby the object is attained more effectively.

The number of times N is counted up when the absolute value of the differential value exceeds the threshold value dTq from a value smaller than the threshold value to a value larger than the threshold value, whereby the object is attained more effectively.

The number of times N is counted up when a polarity of the differential value at the time when the absolute value of the differential value exceeds the threshold value dTq is different from a polarity of the differential value at the time when the absolute value exceeds the threshold value dTq in the nearest past, whereby the object is attained more effectively.

The number of times N is counted up when the motor current is controlled by an inverter of PWM control, the motor current Im is equal to or lower than a predetermined value Imr, and a duty ratio Du of the PWM control is larger than a predetermined duty ratio Dur, whereby the object is attained more effectively.

DESCRIPTION OF THE PREFERRED EMBODIMENTS

Figure 3:
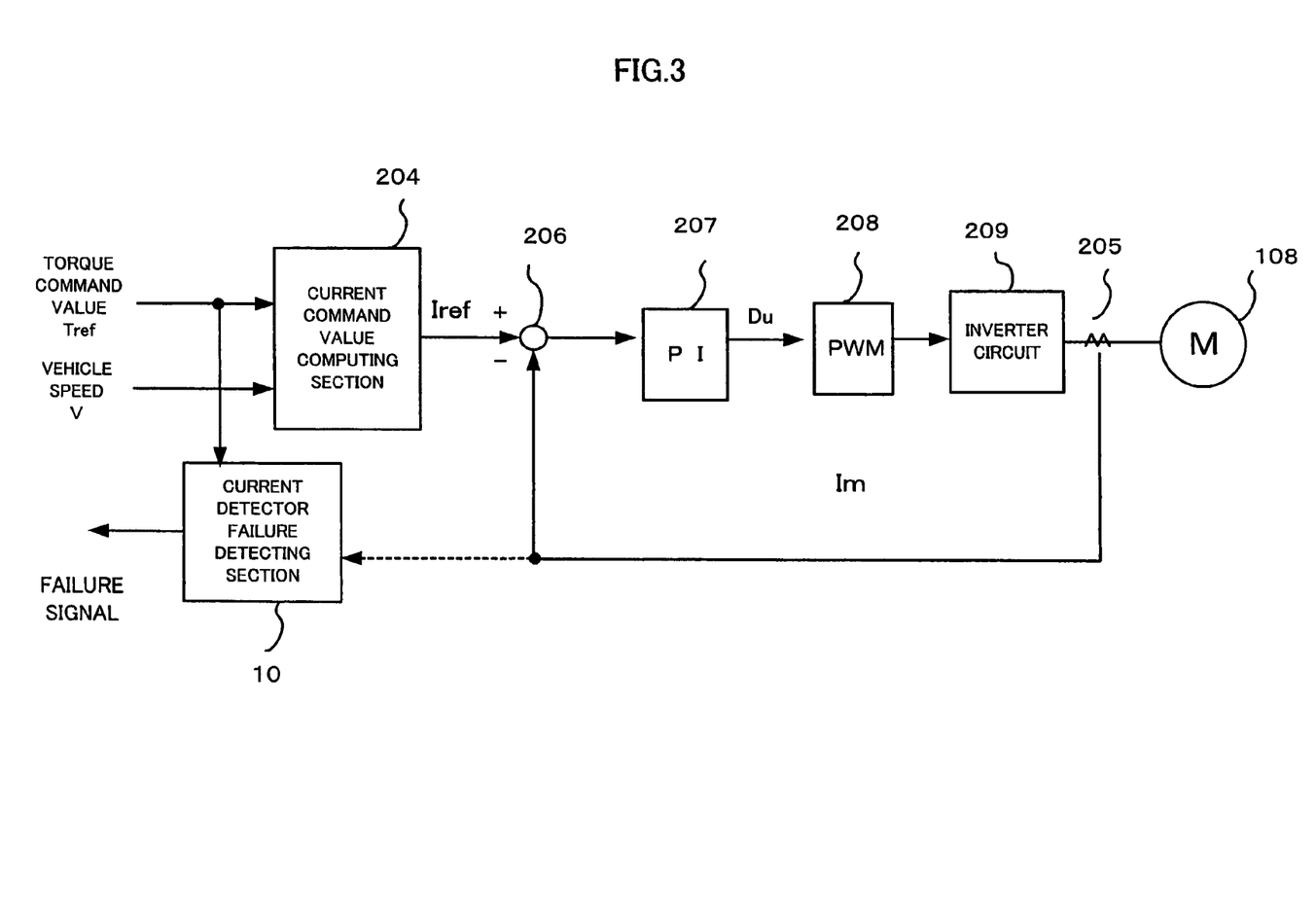
FIG. 3 is a block diagram showing an overall constitution of the present invention.
Figure 4:
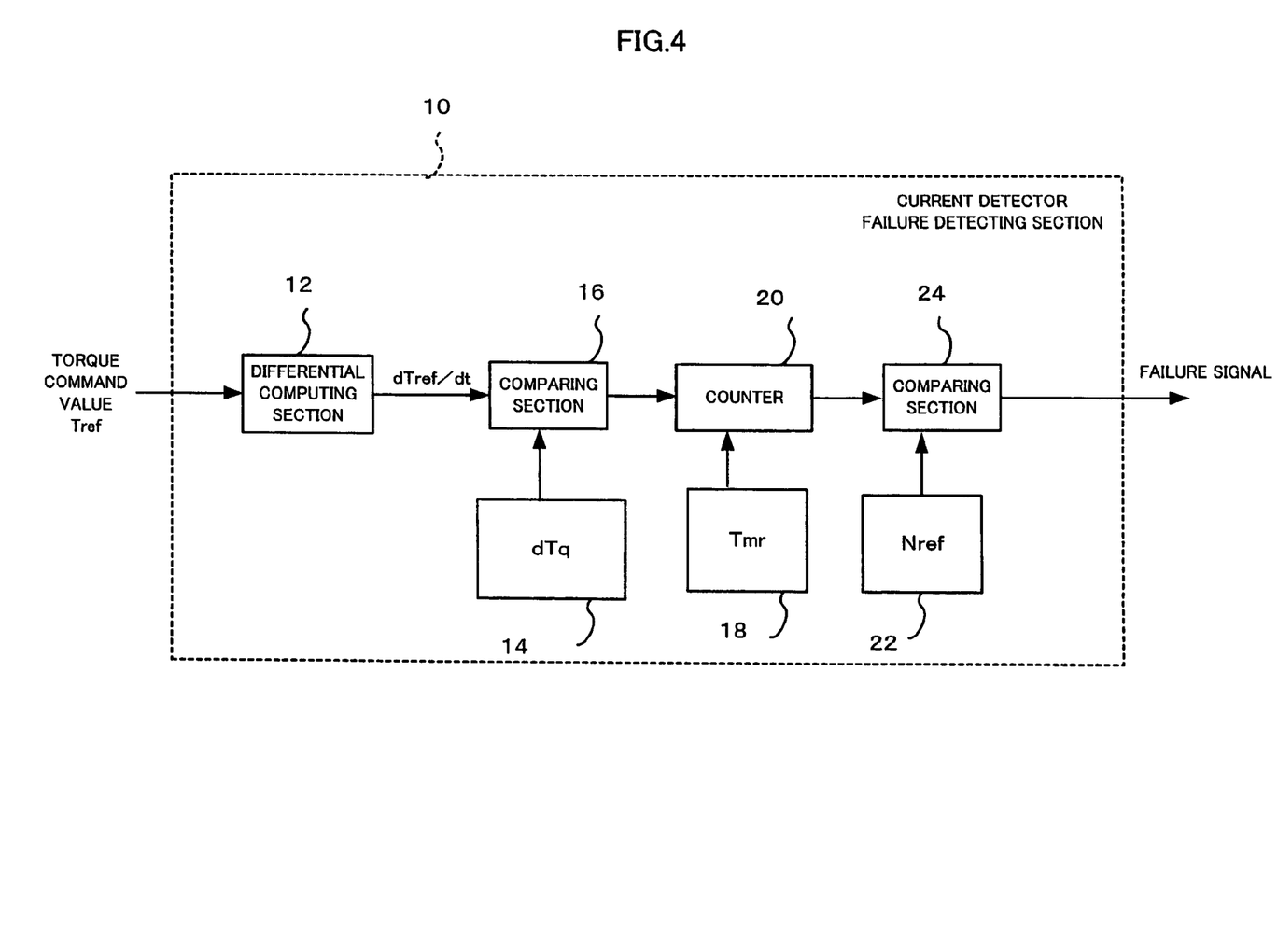
FIG. 4 is a block diagram showing details of a current detector failure detecting section.

Embodiments for carrying out the present invention will be hereinafter explained with reference to the drawings. FIG. 3 is a block diagram showing an overall constitution of an electric power steering apparatus of the present invention that is added with a function for detecting failure of a current detector. FIG. 4 is a block diagram showing detail constitution of a current detector failure detecting section. In FIG. 3, a basis of control of a motor 108 is control as described below.

A torque command value Tref based on torque detected by a torque sensor and a vehicle speed V detected by a vehicle speed sensor 112 are inputted to a current command value computing section 204. A current command value Iref is outputted from the current command value computing section 204 and inputted to a subtracting section 206. On the other hand, a motor current Im detected by a current detector 205 is feed-backed to the subtracting section 206. The subtracting section 206 calculates a deviation (Iref−Im). The deviation (Iref−Im) is inputted to a proportional-integral control section (a PI control section) 207. A duty ratio Du is outputted from the PI control section 207. A PWM control section 207 outputs a PWM signal to an inverter circuit 209 on the basis of the duty ratio Du. The inverter circuit 209 is subjected to a PWM control on the basis of the PWM signal and supplies the motor current Im to the motor 108.

In such motor control, the torque command value Tref based on the torque detected by the torque sensor 110 is inputted to a current detector failure detecting section 10. A result of detection by the current detector failure detecting section 10 is outputted.

Embodiment-1

FIG. 4 is a block diagram showing a detail constitution of a current detector failure detecting section 10. The torque command value Tref is inputted to a differential computing section 12. A differential value (dTref/dt), which is an output of the differential computing section 12, is inputted to a comparing section 16 together with a threshold value dTg of a differential value indicated by a setting section 14. An output of the comparing section 16 is inputted to a counter 20. When the differential value (dTref/dt) is larger than the threshold value Tq, the counter 12 counts up the number of times N by, for example, "1". The counter 20 outputs the number N that is counted by the counter 20 during time of a predetermined time Tmr indicated by the setting section 18. The number of times N outputted from the counter 20 is inputted to a comparing section 24 together with a predetermined number of times Nref indicated by the setting section 22. When the number of times N is larger than the predetermined number of times Nref, the comparing section 24 judges that the current detector 205 has failed. When the number of times N is smaller than the predetermined number of times Nref, the comparing section 24 judges that the current detector 205 has not failed. Then, the comparing section 24 outputs a failure signal.

Figure 5:
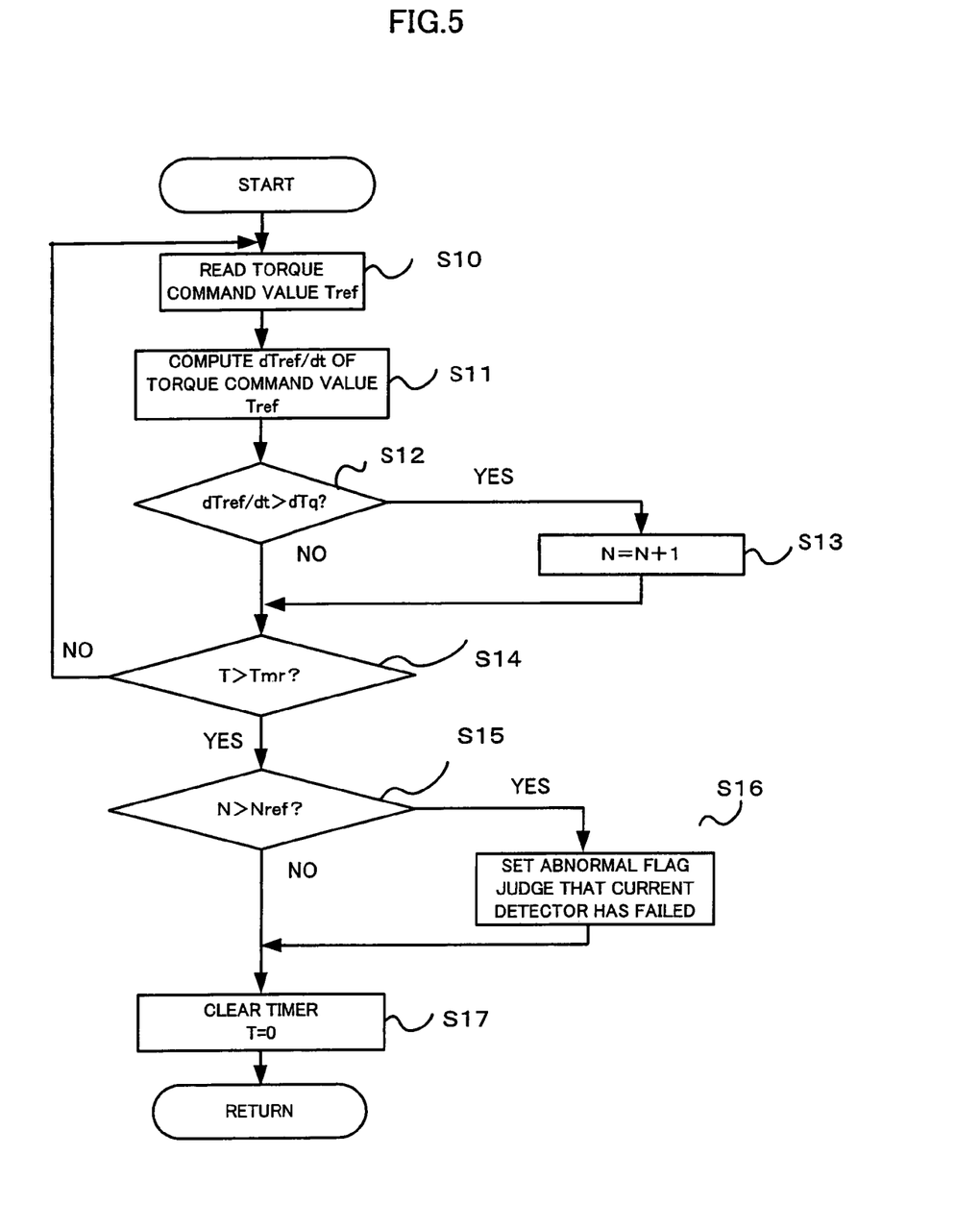
FIG. 5 is a flowchart showing an operation example of an embodiment-1.

FIG. 5 is a flowchart showing an operation example at a time when failure detection for a current detector 205 is executed using software. In FIG. 5, the torque command value Tref is read first (Step S10), and the differential value (dTref/dt) of the torque command value Tref is computed (Step S11). The differential value is compared with a threshold value dTq to find whether the differential value is larger than the threshold value dTg (Step S12). If the differential value is larger than the threshold value dTg (YES), the counter 20 is counted up by "1" and the number of times N is counted up by "1" (Step S13). If the differential value is smaller than the threshold value dTg (NO), the counter 20 is not counted up and the processing proceeds to the next step.

Next, it is judged whether the measurement time T measured by a timer is longer than a predetermined time Tmr (Step S14). If the measurement time T has not reached the predetermined time Tmr (NO), the processing returns to the Step S10 and the measurement is continued. If the measurement time T has reached the predetermined time Tmr, in the next step, it is judged whether the number of times N the differential value of the torque command value Tref exceeds the threshold value dTg is larger than the predetermined number of times Nref (Step S15). If the number of times N is larger than the predetermined number of times Nref, an abnormal flag is set and it is judged that the current detector 205 has failed (Step S16). If the number of times N is smaller than the predetermined number of times Nref, it is not judged that the current detector 205 has failed. The timer is cleared to set the measurement time T to zero and prepare for the next measurement (Step S17).

According to the embodiment-1, making use of the phenomenon that an oscillation occurs because of an output torque of a motor when the current detector 205 fails and the motor is controlled on the basis of the misdetected current value Im, the oscillation is detected as oscillation in a torque command value detected by the torque sensor. When the number of times N the oscillation, that is, a differential value of the torque exceeds the threshold value dTq in the predetermined time Tmr exceeds the predetermined number of times Nref, it is judged the current detector 205 has failed. Thus, even if the failure of the current detector 205 is not permanent failure like miswiring, it is possible to detect even temporary abnormality of the current detector 205 if the predetermined time is set appropriately.

Embodiment-2

In the method described above, since the predetermined time Tmr is introduced, the failure detection delays by the predetermined time Tmr. Thus, next, an embodiment-2 improved to reduce the detection delay will be explained with reference to a flowchart in FIG. 6. Here, the predetermined time Tmr is divided into M pieces to improve the detection delay to be time (Tmr/M) delay.

Figure 6:
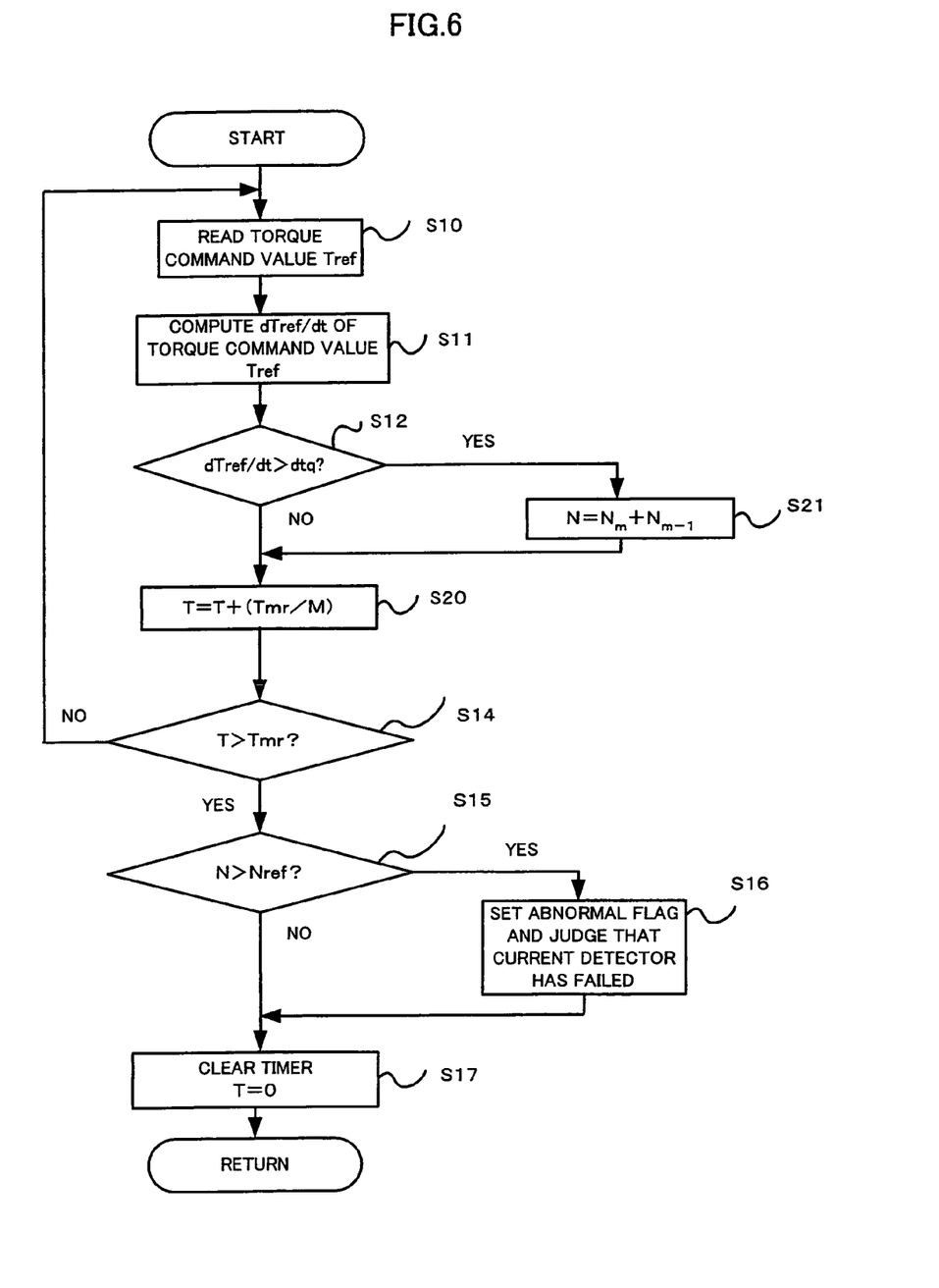
FIG. 6 is a flowchart showing an operation example of an embodiment-2.

The flowchart in FIG. 6 is different from the flowchart in FIG. 5 in a way of counting the number of times N in the Step 13 in FIG. 5 and in that a step of timer count for measurement time is inserted before the step of comparing the measurement time T and the predetermined time Tmr in the Step 14 in FIG. 5.

In FIG. 6, the torque command value Tref is read first (Step S10), and the differential value (dTref/dt) of the torque command value Tref is computed (Step S11). The differential value is compared with the threshold value dTq to find if the differential value is larger than the threshold value dTq (Step S12). If the differential value is smaller than the threshold value dTq (NO), the counter is not counted up and the processing proceeds to the next step.

However, if the differential value is larger than the threshold value dTq (YES), the counter for the number of times N is counted up to the number of times N by adding, at the time when the measurement time Tref is divided into M pieces, the number of times Nm counted Mth time to the number of times $N_{m-1}$ counted (M−1)th time from the first (Step S21). Then, the measurement time T is counted up by time (Tmr/M) (Step S20). Thereafter, it is judged whether the measurement time has reached the predetermined time Tmr (Step S14). Processing after that is the same as the processing in the flowchart in FIG. 5.

For example, when the predetermined time Tmr is set as 100 [ms] and M is set as "5", it is possible to measure the number of times N in the past 100 [ms] every 20 [ms] to detect failure of the current detector 205. In other words, it is possible to detect failure of the current detector 205 every 20 [ms] rather than every 100 [ms], thereby making it possible to detect the failure at a high speed.

As explained above, as to the predetermined time Tmr for judging whether the current detector 205 has failed, delay in time, for example, delay in judging the next failure when the predetermined time Tmr further elapses after judging whether the current detector 205 has failed once, is never caused. It is possible to detect the failure of the current detector 205 every time-delay of the time (Tmr/M). Thus, there is an advantage that it is possible to detect the failure of the current detector 205 quickly.

Embodiment-3

Figure 7:
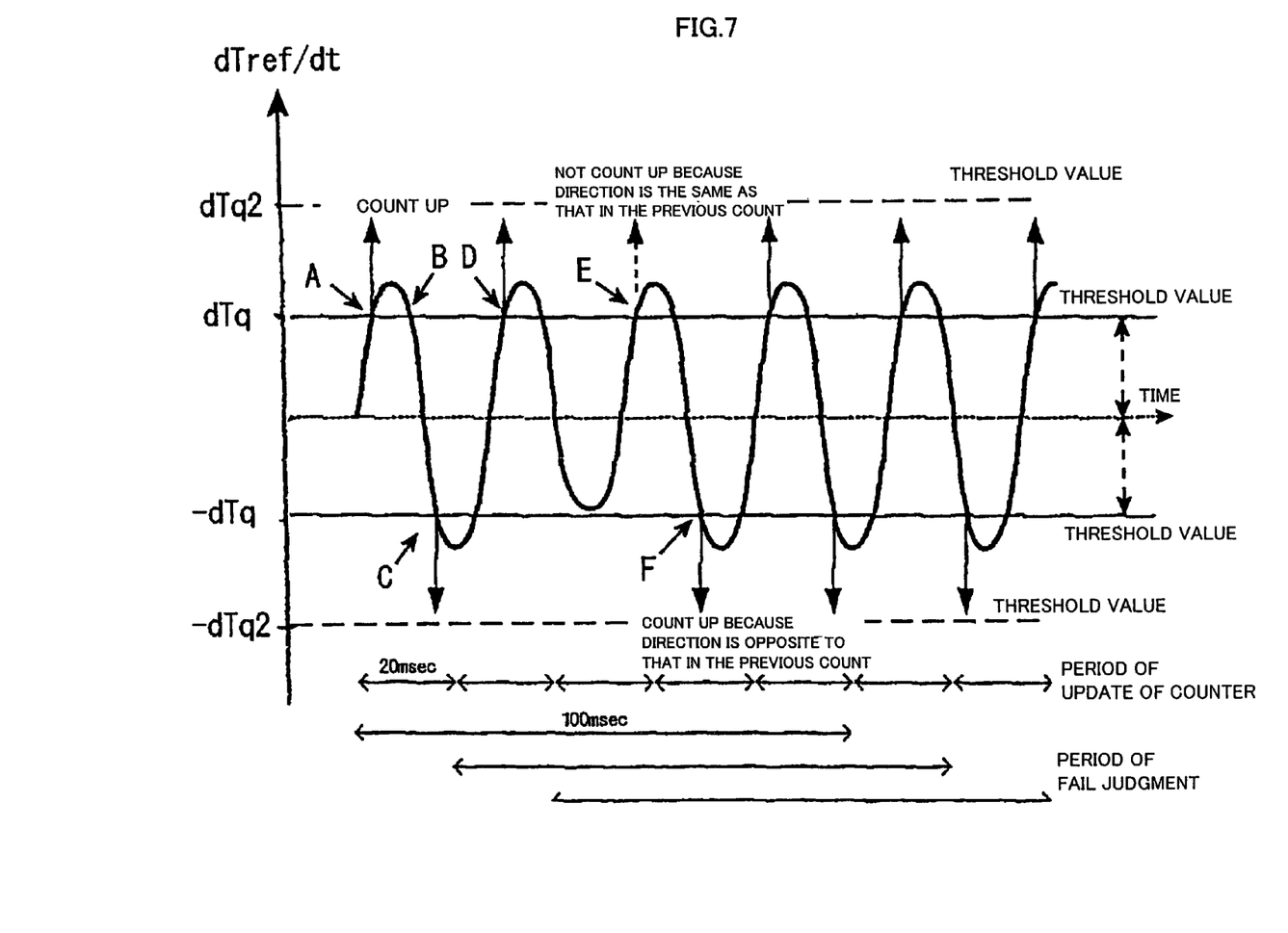
FIG. 7 is a schematic diagram representing torque oscillation with a torque differential value.

In the next embodiment, a method for making it possible to detect more surely whether the oscillation that occurs in torque is a normal oscillation or an oscillation due to the failure of a current detector 205. FIG. 7 is a schematic diagram for judging a threshold value of torque oscillation due to the failure of the current detector 205. In FIG. 7, first, at a point A, an absolute value of the differential value dTref/dt exceeds the threshold value dTq from a value smaller than the threshold value to a value larger than the threshold value. Thus, the number of times N is counted up by "1". However, at a point B, an absolute value of the differential value dTref/dt exceeds the threshold value dTq from a value larger than the threshold value to a value smaller than the threshold value. Thus, the number of times N is not counted up by "1".

In FIG. 7, at a D point, an absolute value of the differential value dTref/dt exceeds the threshold value dTq from a value smaller than the threshold value to a value larger than the threshold value. In addition, a point in the past closest to the D point, where a threshold value of the differential value dTref/dt exceeds the threshold value dTq, is a C point. Since polarities of the differential value dTref/dt at the D point and the C point are different, the number of times N is counted up by "1". At an E point, an absolute value of the differential value dTref/dt exceeds the threshold value dTq from a value smaller than the threshold value to a value larger than the threshold value. However, a point in the past closest to the point E where a threshold value of the differential value dTref/dt exceeds the threshold value dTq is the D point. Since the polarities of the differential value dTref/dt at the E point and the D point are the same, the number of times N is not counted up by "1" at the E point.

Figure 8:
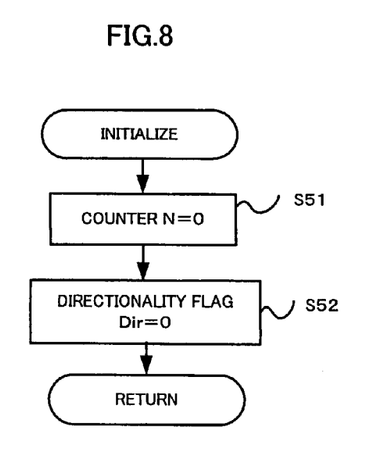
FIG. 8 is a part of a flowchart showing an operation example in which a polarity is taken into account in addition to a magnitude of a torque differential value.
Figure 9:
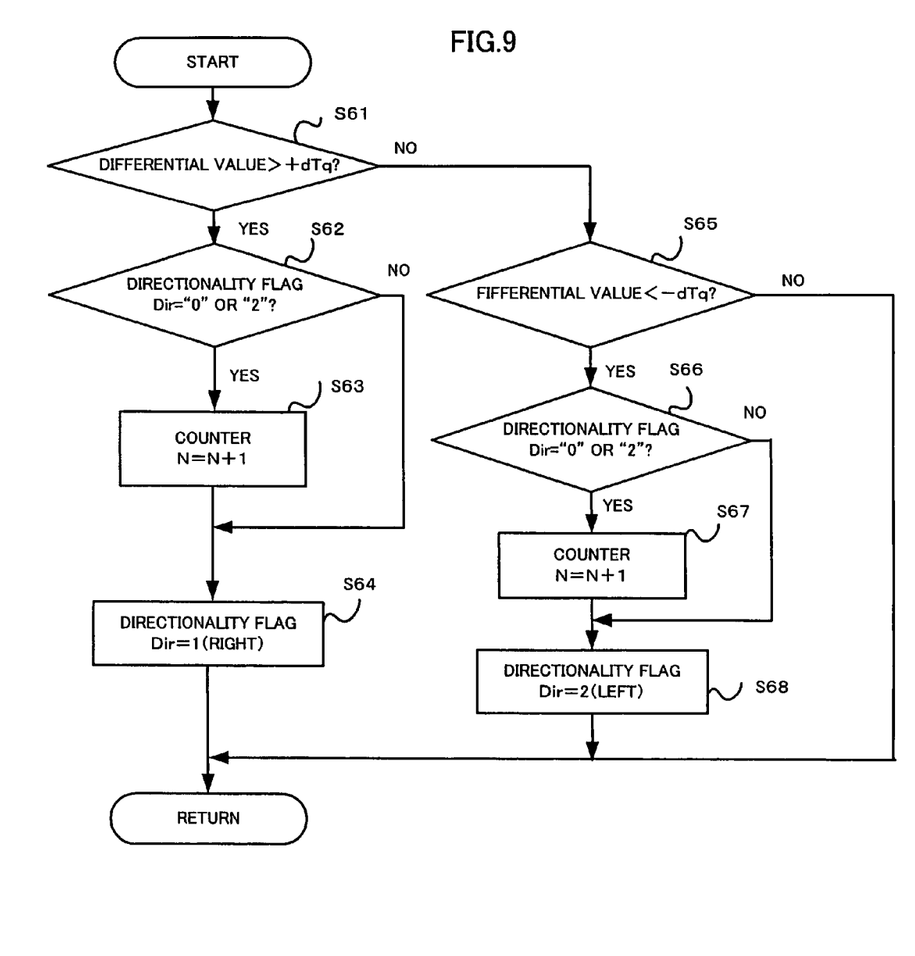
FIG. 9 is a part of a flowchart showing an operation example in which a polarity is taken into account in addition to a magnitude of a torque differential value.

Taking into account the above count-up principle, in a flowchart in FIGS. 8 and 9, further conditions are added to the count-up step of the number of times N in the Step 13 in FIG. 5. In FIG. 8, first, for initialization, the counter N (i.e., the number of times N) is set to "0" (Step S51). Next, a directionality flag Dir is set to "0" (Step S52).

After ending the initialization, in FIG. 9, it is judged whether the differential value dTref/dt is larger than a threshold value (+dTq) (Step S61). If the differential value dTref/dt is larger than the threshold value (+dTq), it is judged whether the directionality flag Dir is "0" or (Step S62). Note that, as the directionality flag Dir, Dir="0" means rotation stop, Dir="1" means right rotation, and Dir="2" means left rotation. If the directionality flag Dir is "0" or "2", the counter N is counted up by "1" and the processing proceeds to the Step S64 (Step S63). If the directionality flag Dir is "1", the counter N is not counted up by "1" and the processing proceeds to the Step S64. Then, "1" (right rotation) is substituted in the directionality flag Dir (Step S64). In other words, in the Step S62, the counter N is counted up by "1" when the directionality Dir is not right rotation but left rotation.

Similarly, in the Step S61, if the differential value dTref/dt of the torque command value Tref is smaller than the threshold value (+dTq), it is judged whether the differential value dTref/dt is smaller than the threshold value (−dTq) (Step S65). In other words, it is judged whether an absolute value of the differential value of the torque command value Tref is larger than the threshold value. If the absolute value of the differential value is larger than the threshold value, the directionality flag Dir is judged (Step S66). If the directionality flag Dir is "0" or "1", the processing proceeds to the Step S67 and the counter N is counted up by "1" (Step S67). If the directionality flag Dir is "2", the processing jumps to the Step S68. A number "2" (left rotation) is substituted in the directionality flag Dir (Step S68).

According to such an operation, the number of times N is counted up by "1" only when an absolute value of the differential value dTref/dt of the torque command value Tref is larger than the threshold value dTq and the differential value at that point exceeds the threshold value dTq for the first time and when a direction of the differential value exceeding the threshold value dTq this time is different from that in the last time. Thus, it is possible to distinguish an oscillation of a torque value, which usually occurs, from the oscillation of a torque value due to abnormality of the current detector and detect the failure of the current detector 205 surely without misdetection.

In the explanation of the embodiments, a value to be counted up is "1" as an example. However, the value to be counted up is not limited to "1". It is possible to detect the failure of the current detector 205 more carefully by weighting the value to be counted up according to the failure detection conditions.

For example, in FIG. 7, when 2dTq and −2dTq are set as threshold values in addition to dTq and -dTq and, when the differential value dTref/dt exceeds the threshold value 2dTq or −2dTq, a value to be counted up is set to "2". This is because, when the differential value dTref/dt of the torque command value exceeds the threshold value 2dTq, since it is possible that the current detector 205 falls into more significant failure than the failure at the time when the differential value dTref/dt exceeds the threshold value dTq, it is necessary to count up the counter N earlier and detect the failure of the current detector 205 quickly.

In the embodiment-3, in FIG. 7, as an example of weighting of another value to be counted up, the condition "although an absolute value of the differential value dTref/dt at the E point exceeds the threshold value dTq from a value smaller than the threshold value to a value larger than the threshold value, since polarities of the differential value dTref/dt at the E point and the D point are the same and directions thereof are the same, the number of times N is not counted up by "1" at the E point" is set. However, weighting for a value to be counted may be performed, for example, "when an absolute value of the differential value dTref/dt exceeds the threshold value dTq from a value smaller than the threshold value to a value larger than the threshold value and directions thereof are the same, for example, at the E point, the number of times N is counted up by "1" and, for example, at the F point, the number of times is counted up by "2"".

Embodiment-4

Figure 10:
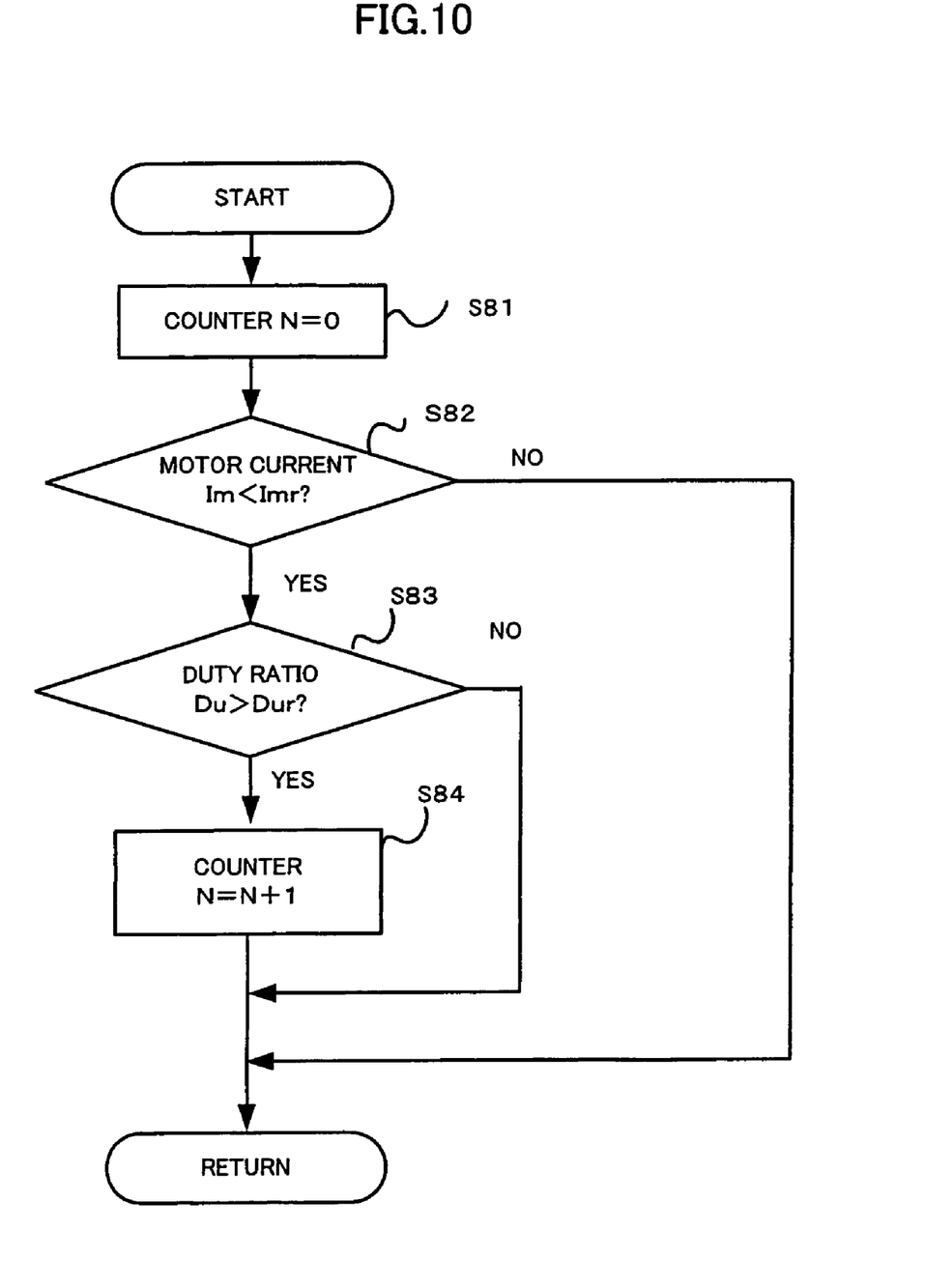
FIG. 10 is a flowchart showing an operation example of failure detection for a current detector using a duty ratio.

In the next embodiment-4 to be explained, it is judged that the current detector 205 has failed when a differential value of the torque command value Tref exceeds a threshold value, the current detection value is "0", and a duty ratio exceeds a threshold value. This is a detection of failure at the time when, for example, an output line of the current detector 205 is broken. FIG. 10 is a flowchart in which the further condition described above is added to the count-up step for the number of times N in the Step 13 in FIG. 5.

In FIG. 10, the counter N is set to "0" (Step S81). Next, it is judged whether the motor current Im is "0". The motor current Im is not "0" strictly when a detection error and the like are taken into account. Thus, when the motor current Im is smaller than the predetermined value Imr, the motor current Im is regarded as "0" (Step S82). If the motor current Im is larger than the predetermined value Imr, the number of times N is not counted up and the processing ends. If the motor current Im is smaller than the predetermined value Imr, it is judged whether the duty ratio Du of the inverter circuit 209 is larger than the predetermine value Dur (Step S83). If the duty ratio Du is larger than the threshold value Dur, the motor current Im is "0" regardless of the fact that the duty ratio is large, which means abnormality. Thus, the number of times (the counter) N is counted up by "1" (Step S84). If the duty ratio is smaller than the predetermined duty ratio Dur, the number of times N is not counted up by "1" and the processing ends.

It is possible to detect failure such as disconnection of a current detector according to the method of counting up the number of times N based on the processing of the steps described above.

In the embodiment-4 explained above, a motor current is subjected to a feedback control. However, it is needless to mention that the present invention can be applied to an electric power steering apparatus in which a motor current is used for control and protection even if the motor current is not subjected to the feedback control.

As explained above, if the present invention is used, it is possible to provide an electric power steering apparatus that can detect the failure of the current detector 205 with less misdetection and quickly using the torque oscillation from a torque sensor.

According to the electric power steering apparatus of the present invention, it is judged that a current detector has failed when the number of times a differential value of a torque command value exceeds a threshold value in a predetermined time is larger than a predetermined number of times. Thus, if the predetermined time is set appropriately, it is possible to surely detect even temporary failure of the current detector different from permanent abnormality like miswiring.

According to the present invention, a problem of detection delay at the time when a requirement of a predetermined time Tm is added can be reduced to time (Tm/M) by dividing the predetermined time into M pieces. Thus, it is possible to detect the failure of a current detector earlier and surely.

What is claimed is:

1. An electric power steering apparatus comprising a motor that applies a steering assist force to a steering system of a vehicle, a torque sensor that detects a torque command value Tref generated in a steering shaft, and a current detector that detects a motor current Im of the motor, wherein the electric power steering apparatus being controlled on the basis of at least a current command value Iref, which is calculated on a basis of the torque command value Tref, and the motor current Im, wherein it is judged that the current detector has failed when the number of times N (N is an integer) an absolute value of a differential value of the torque command value Tref exceeds a predetermined threshold value dTq in a predetermined time Tmr has reached a predetermined number of times Nref.

2. An electric power steering apparatus according to claim 1, wherein the number of times N is the number of times ($N_m + N_{m-1}$) obtained by equally dividing the predetermined time Tmr into M pieces and adding the number of times Nm the absolute value exceeds the threshold value dTq in an Mth time frame to the total number of times $N_{m-1}$ the absolute value exceeds the threshold value dTq in first to (M−1)th time frames.

3. An electric power steering apparatus according to claim 1, wherein the number of times N is counted up when the absolute value of the differential value exceeds the threshold value dTq from a value smaller than the threshold value to a value larger than the threshold value.

4. An electric power steering apparatus according to claim 1, wherein the number of times N is counted up when a polarity of the differential value at the time when the absolute value of the differential value exceeds the threshold value dTq is different from a polarity of the differential value at the time when the absolute value exceeds the threshold value dTq in the nearest past.

5. An electric power steering apparatus according to claim 1, wherein the number of times N is counted up when the motor current is controlled by an inverter of PWM control, the motor current Im is equal to or lower than a predetermined value Imr, and a duty ratio Du of the PWM control is larger than a predetermined duty ratio Dur.

6. An electric power steering apparatus according to claim 2, wherein the number of times N is counted up when the absolute value of the differential value exceeds the threshold value dTq from a value smaller than the threshold value to a value larger than the threshold value.

7. An electric power steering apparatus according to claim 2, wherein the number of times N is counted up when a polarity of the differential value at the time when the absolute value of the differential value exceeds the threshold value dTq is different from a polarity of the differential value at the time when the absolute value exceeds the threshold value dTq in the nearest past.

8. An electric power steering apparatus according to claim 2, wherein the number of times N is counted up when the motor current is controlled by an inverter of PWM control, the motor current Im is equal to or lower than a predetermined value Imr, and a duty ratio Du of the PWM control is larger than a predetermined duty ratio Dur.

* * * * *